Oct. 22, 1935.   C. W. HANSELL   2,018,358
FILTER

Original Filed Sept. 24, 1931

INVENTOR-
CLARENCE W. HANSELL
BY H. S. Grover
ATTORNEY-

Patented Oct. 22, 1935

2,018,358

UNITED STATES PATENT OFFICE 2,018,358

FILTER

Clarence W. Hansell, Port Jefferson, N. Y., assignor to Radio Corporation of America, a corporation of Delaware Original application September 24, 1931, Serial No. 564,770. Divided and this application October 19, 1932, Serial No. 638,475

4 Claims. (Cl. 178—44)

My present application is a division of my copending application, Serial Number 564,770, filed September 24, 1931.

My present invention relates to a filtering system for use in connection with alternating current circuits such as radio transmitters or radio receivers. An object of my present invention is to provide an improved filtering system utilizing electromagnetic resonators such as magnetostriction oscillators.

Many filters now in use, or about to be used, have sloping or imperfect cut-off region characteristics as a result of which their action is not all that is to be desired. To provide apparatus for improving the characteristic curves of such filters especially in their imperfect cut-off regions is a further object of my present invention. To carry it out, I connect to the ordinary filter having this undesirable characteristic a filter such as described in my copending application or in my present application, which has a sharp characteristic in the imperfect region of the ordinary filter and the combined action of the two produces a filtering system having an exceedingly improved action.

Figure 2:
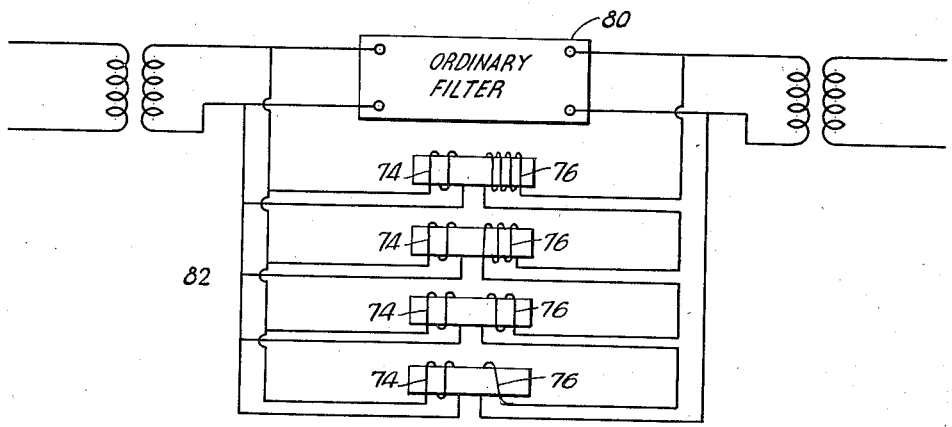
Figure 3:
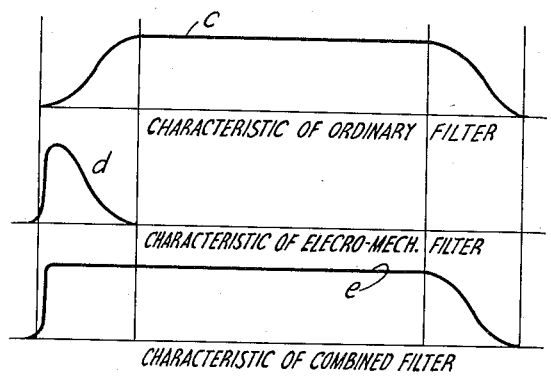

An attempt has been made to define my present invention with particularity in the appended claims. However, it may best be understood both as to its structural organization and mode of operation by referring to the accompanying drawing wherein, Figure 1 is a wiring diagram of my improved electromagnetic filter;

Figure 2 illustrates a system wherein my improved filter may be used to sharpen up the characteristic of an ordinary filter; and, Figure 3 are curves explanatory of my present invention as illustrated in Figure 2.

In carrying out my present invention I make use of magneto-striction oscillators with overlapping resonance curves, input coils of the oscillators being all connected in parallel with like polarity and the output coils are all connected together in series with alternatingly reversed polarity or vice versa. The coupling between the input and output circuits of the filter is established by virtue of the magneto-strictive phenomena and the resonance characteristics of the rods which form the coupling or filter oscillators. The phase of energy fed through this coupling reverses as the frequency passes through resonance at a frequency intermediate the frequencies of the magneto-strictive rods used. Consequently, this requires the alternatingly reverse polarity of the coils as shown in Figure 1 in order to obtain efficient energy transfer at frequencies corresponding to the overlapping frequencies of the magnetostrictive elements. In general, it may be said that the filters of my present application are more suitable for operation at lower frequencies than the piezo-electric crystal filters described in my copending parent application.

Figure 1:
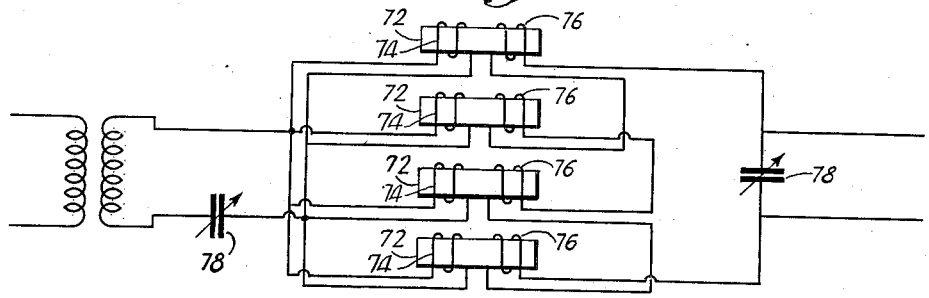

In particular, as shown in Figure 1, for low frequencies, I make use of electromechanical oscillators in the form of magneto-striction oscillators 12. These magneto-striction or electrolators 12. These magneto-striction or electromagnetic oscillators are made up of any magnetostrictive material such as nickel, which possesses the property of converting electromagnetic energy into mechanical energy and vice versa. The input coils 14 are connected in parallel and with like polarity whereas the output coils 16 are alternatingly connected with reversed polarity. If desired, of course, the coils 16 may be considered the input side of the system and coils 14 the output side of the system, the direction in which energy is passed by the filter being immaterial. Variable condensers 18 are provided for tuning the inductance of the oscillators, and, as indicated any form of coupling to other circuits may be used such as direct, conductive connection or inductive coupling.

In Figure 1, the tuning of the input and output circuits for the filters shown not only assist in obtaining the best impedances to use with the filter but it also suppresses undesired frequencies. The electromechanical oscillators, such as piezoelectric crystals and magnetostriction oscillators and also resonant transmission lines respond to a series of frequencies and exhibit resonance at a series of frequencies approximately in harmonic relation. The tuned input and output circuits do not respond to harmonics of their fundamental frequencies and so suppress undesired frequencies which would otherwise pass through the filter. Thus I combine broadly tuned circuits having only one resonant frequency with circuits, or mechanically oscillating equivalents of circuits, which tune sharply for a series of frequencies, to obtain a filter with sharp frequency discrimination but only one pass band.

As indicated hereinbefore a still further use for my invention is to sharpen up the cut-off characteristics of the more common types of filters. This may be done by connecting one of my electromechanical filters in parallel with an ordinary filter. Then, if the pass band of the electromechanical filter lies in the imperfect cut-off region of the ordinary filter it will extend the pass band of the ordinary filter and the cut-off characteristics of the combination will be that of the electromechanical filter, which is very sharp, while the width of pass band will be substantially that of the ordinary filter.

Referring to Figure 2 wherein such an arrangement is shown, an ordinary filter 80 is paralleled with an improved filter 82 according to my present invention.

The input coils 74, shown in Fig. 2, are all so connected and wound that currents flowing from the common lead to all the coils will flow through the coil windings in like directions around the rods and at any given instant tend to magnetize the rods with like polarity.

The output coils 76, on the other hand, which are shown connected in series, are wound in alternately opposite directions. A common current traversing all the coils will flow around a rod having a given frequency response band in a given direction but will flow in an opposite direction around a rod responsive to a next adjacent overlapping frequency band.

Likewise, the output coils may all be wound in the same direction and then connected together in series with their terminals alternately reversed. This will give the same result as if the coils were wound oppositely.

The characteristic curve of the ordinary filter is given by curve c of Figure 3, and the characteristic curve of filter 82 is given by curve d of Figure 3, and the improved characteristic of the combined filters is given by curve e of Figure 3.

If it is desired to sharpen up both ends of curve c of the ordinary filter, it should be paralleled by another of my improved filters having a band pass characteristic corresponding in frequency to the other end of the frequency range of the ordinary filter whose curve is illustrated by curve c of Figure 3.

It will be noted that I have shown a somewhat triangular shaped characteristic for the electromechanical filter to make it correct the ordinary filter more perfectly. I may obtain this triangular characteristic by varying the number of turns in the coils of the magneto-striction oscillators as shown or I may use various sizes of series impedances with any form of electromechanical vibrator.

In the crystal filter, such as Figure 5 of my co-pending application, I may obtain the desired results by varying the sizes of the crystal electrodes or by varying the couplings to either input or output electrodes or both. In fact any method for varying the effectiveness of the individual vibrators, including the application of damping, may be used whereby the combination of filters give the desired characteristic.

Having thus described my invention, what I claim is:

1. A filter circuit comprising a plurality of magneto-striction oscillators having overlapping resonance curves, each of said oscillators having an input circuit and an output circuit, means for connecting a group of like circuits of said oscillators in parallel with like polarity, and, means for coupling the other circuits of said oscillators effectively in series, some of the other circuits being connected with relatively reversed polarity with respect to said group of circuits in parallel.

2. Apparatus for selectively passing energy of a band of frequencies comprising a plurality of electromagnetic vibrators, said vibrators having symmetrical, displaced overlapping resonant circuits and each of said vibrators having a pair of coils, means for connecting corresponding coils located on one end of said vibrators in series, and means for connecting the other corresponding coils of said vibrators located on an end opposite from said series connected coils in parallel.

3. A band pass filter comprising a plurality of electromagnetic vibrators each of said vibrators having a different resonant frequency, a pair of coils operatively associated with each of said vibrators, means for connecting the coils located on one end of said vibrators in parallel, and means for connecting other like coils of each pair of coils located on an end opposite from said parallel connected coils in series.

4. A band pass filter comprising a plurality of electromagnetic vibrators each having a different resonant frequency, said vibrators having an input circuit and an output circuit, a pair of coils located at each end of said vibrators, means for connecting each of the coils located on one side of said vibrators in parallel, and means for connecting each of the coils located at the other side of said vibrators in series, and tuning condensers operatively connected in both the input and output circuits to tune the coils of said vibrators.

CLARENCE W. HANSELL.